United States Patent
Stauder et al.

(10) Patent No.: US 9,472,162 B2
(45) Date of Patent: Oct. 18, 2016

(54) METHOD OF MAPPING SOURCE COLORS FROM A SOURCE COLOR GAMUT INTO A TARGET COLOR GAMUT

(71) Applicant: THOMSON LICENSING, Issy de Moulineaux (FR)

(72) Inventors: Jurgen Stauder, Montreuil/Ille (FR); Laurent Blonde, Thorigne-Fouillard (FR); Patrick Morvan, Laille (FR)

(73) Assignee: THOMSON LICENSING, Issy Les Moulineaux (FR)

( * ) Notice: Subject to any disclaimer, the term of this patent is extended or adjusted under 35 U.S.C. 154(b) by 0 days.

(21) Appl. No.: 14/579,977

(22) Filed: Dec. 22, 2014

(65) Prior Publication Data

US 2015/0179135 A1  Jun. 25, 2015

(30) Foreign Application Priority Data

Dec. 23, 2013 (EP) .................................... 13306833

(51) Int. Cl.

| | |
|---|---|
| G06K 9/00 | (2006.01) |
| G09G 5/02 | (2006.01) |
| G06T 11/00 | (2006.01) |
| H04N 1/60 | (2006.01) |
| H04N 9/67 | (2006.01) |

(52) U.S. Cl.
CPC .............. *G09G 5/02* (2013.01); *G06T 11/001* (2013.01); *H04N 1/6061* (2013.01); *H04N 9/67* (2013.01)

(58) Field of Classification Search
USPC ........ 382/167, 162; 345/589, 590, 591, 690; 358/1.9, 523, 518, 525
See application file for complete search history.

(56) References Cited

U.S. PATENT DOCUMENTS

| | | | | |
|---|---|---|---|---|
| 6,724,500 B1 * | 4/2004 | Hains | ................... | H04N 1/6019 |
| | | | | 358/1.9 |
| 7,755,817 B2 * | 7/2010 | Ho | ........................ | H04N 1/6058 |
| | | | | 358/1.9 |
| 7,835,033 B2 | 11/2010 | Bala et al. | | |
| 8,466,936 B2 * | 6/2013 | Guo | ........................ | G09G 5/02 |
| | | | | 345/589 |
| 8,629,881 B2 * | 1/2014 | Blonde | ................ | H04N 1/6058 |
| | | | | 345/589 |
| 2010/0164980 A1 | 7/2010 | Ten | | |
| 2010/0220237 A1 | 9/2010 | Doser et al. | | |

FOREIGN PATENT DOCUMENTS

| | | |
|---|---|---|
| EP | 0543511 | 5/1993 |
| EP | 1796372 | 6/2007 |

OTHER PUBLICATIONS

Kang et al: "Color decomposition method for multi-primary display using 3D-LUT in linearized lab space"; Jan. 17, 2005; Proceedings of the SPIE—The International Society for Optical Engineering; vol. 5667, No. 1; pp. 354-363.

(Continued)

Primary Examiner — Anh Do
(74) Attorney, Agent, or Firm — Tutunjian & Bitetto, P.C.

(57) ABSTRACT

In one implementation, the method includes applying color gamut mapping directly to incoming RGB color coordinates resulting in mapped source coordinates R"G"B". The source coordinates are then transformed into target coordinates R'G'B'. According to another implementation, incoming source coordinates RGB are transformed into target coordinates R"G"B" and the color gamut mapping is applied directly to the target coordinates R"G"B" resulting in mapped target coordinates R'G'B'.

10 Claims, 3 Drawing Sheets

(56) References Cited

OTHER PUBLICATIONS

Cheng et al: "Color reproduction system based on color appearance model and gamut mapping"; Proceedings of the SPIE—The International Society for Optical Engineering, vol. 4080, pp. 167-178, Jul. 26-27, 2000.

Johnson: "Gamut Warnings and What to Do About Them"—Photo Tips @ EarthboundLight, Nov. 13, 2011, Retrieved from the Internet:URL:http://www.earthboundlight.com/phototips/taking-control-gamut-warnings.html; pp. 1-4.

Johnson:"Photoshop Color Management Warnings and What They Do—Photo Tips @ Earthbound Light"; Feb. 11, 2007 ; Retrieved from the Internet:URL:http://www.earthboundlight.com/phototips/photoshop-color-management-warnings.html[; pp. 1-4.

Montag etal: "Gamut mapping: Evaluation of chroma clipping techniques for three destination gamuts"; Jan. 1, 1998 at the IS&T/SID Sixth Color and Imaging Conference in Scottsdale—pp. 57-61.

Braun etal "Image Lightness Rescaling Using Sigmoidal Contrast Enhancement Functions"; 1999; Proceedings of SPIE Electronic Imaging Conference (EIi99); pp. 1-39.

Han: "Real time gamut mapping architecture and implementation for color blind people"; APCHI 2004 : Asia Pacific conference on computer human interaction; No. 6, Jun. 29, 2004,vol. 3101, pp. 133-142.

Search Report Dated Apr. 24, 2014.

International Standard ISO 15076-1, "Image technology colour management—Architecture, profile format and data structure—Part 1: Based on ICC.1:2004-10", International Organization for Standardization, Dec. 1, 2005, pp. 1-112.

* cited by examiner

METHOD OF MAPPING SOURCE COLORS FROM A SOURCE COLOR GAMUT INTO A TARGET COLOR GAMUT

This application claims the benefit, under 35 U.S.C. §119 of European Patent Application No. 13306833.8, filed Dec. 23, 2013.

TECHNICAL FIELD

The invention concerns a method for color gamut mapping colors of a source color gamut into colors in a target color gamut, both colors being expressed in a device-dependent color space.

BACKGROUND ART

Gamut mapping of colors of an image has the goal that the mapped colors are inside of the color gamut of a target display device. A second goal is that the mapped colors make efficient and complete use of the color gamut of the target display device. In general, color gamut mapping can be applied to any color values that are defined within a source color gamut in order to transform them such that they are included in a destination color gamut. The source color gamut can be linked to an image capture device such as camera or scanner. It can be linked to a reference display device such as a proof view display device used to control the creation or color processing of images. It can also be linked to a predefined, virtual color gamut as defined for instance in a standard such as ITU-R BT.709. The target color gamut can be linked to a specific reproduction display device. It can be linked also to a predefined gamut for transmission, compression or storage purpose. For example, it can be linked to a predefined, virtual color gamut as defined for instance in a standard such as ITU-R BT.2020. It can be linked to a specific medium such as film or paper prints. In the following we will simplify by talking about a source display device having a source gamut and a target display device having a target color gamut.

Color gamut mapping is carried out usually in specific color spaces. Some methods use the L*a*b* color space defined by the CIE in 1976. In L*a*b* space, a constant angle in a*b* plane is assumed to correspond to identically perceived hue. The L coordinate represents the perceived intensity of light. Unfortunately, this color space was shown to not well represent hues, notably in blue tones. Other methods use the JCh color space defined in the CIECAM-02 standard defined by the CIE in 2002. In JCh space, the h coordinate is assumed to correspond to perceived hue by the human eye and the J coordinate is assumed to correspond to perceived intensity. JCh space was shown to better represent hues and intensity than L*a*b*, but it requires higher complexity to be calculated.

When doing gamut mapping in L*a*b* color space, the classical approach is shown in FIG. 1. First, a source forward transform transforms device dependent color coordinates representing the colors of an image in a device-dependent color space, for example R,G,B in the "RGB" color space, into device-independent color coordinates in a device-independent color space, for example X,Y,Z in the "XYZ" color space. Then, color gamut mapping can be applied to the XYZ coordinates since L*a*b* coordinates can be derived from and transformed into XYZ coordinates by a fixed formula standardized in 1987 by the CIE. After gamut mapping, the mapped device independent color coordinates are usually transformed back into device dependent color coordinates.

The article entitled "Color reproduction system based on color appearance model and gamut mapping", from Fang-Hsuan GHENG et al., published in 2000 in the Proceedings of SPIE, Vol. 4080, pages 167-178, discloses a typical gamut mapping scheme using the JCh color space instead of the L*a*b* color space.

A problem addressed by this invention is the increased computational load which is required when colors should be mapped as described above in a device-independent color space. This problem is confirmed by Dong-Woo Kang et. al. in their publication entitled "COLOR DECOMPOSITION METHOD FOR MULTIPRIMARY DISPLAY USING 3D-LUT IN LINEARIZED LAB SPACE" published in the Proceedings of the SPIE vol. 5667 no. 1 pages 354-63. The authors maintain the transformation of color coordinates back from and forward into device independent color space but use—instead of the non-linear L*a*b* color space—a linearized device independent color space such that the color transformation of color coordinates is less heavy in computation.

Another solution to this problem of increased computational load is to establish a 3D Look-Up-Table (LUT) mapping directly device-dependent coordinates into other, mapped device-dependent coordinates. For this solution, the three processing steps such as shown in FIG. 1 are pre-concatenated and pre-calculated into one LUT which is then used to map color coordinates of an image. If the mapping operation by itself is fast due to the application of only one LUT, the pre-calculation of the concatenated LUT is slow. One reason for the LUT calculation being slow is that, as shown above, the device-dependent color coordinates defining a color to map, for example RGB, needs to be transformed, before mapping, into device-independent color coordinates, for example XYZ or Lab, as specified notably by the CIE.

A second problem addressed by this invention is when the gamut mapping operator depends on metadata, as for instance described in US2010-220237. If the metadata changes, the mapping operator needs to be updated or recalculated, which is usually slow. If the update is slow, the frequency of update is limited. Changing metadata can be processed only in the frequency of updates of the mapping operator, so finally, the frequency of changes in the metadata is limited. As shown in FIG. 2, typical metadata for classical color gamut mapping is the gamut boundary descriptions (GBD) of the source color gamut and of the target color gamut.

In a first application of such a color gamut mapping, the source GBD describes the color gamut of a source display device that is capable to reproduce colors from RGB color coordinates used to control it. The target GBD describes the color gamut of a target display device that is capable to reproduce colors from R'G'B' color coordinates used to control it. The GBD of the target color gamut depends for instance on the settings of the target display device and/or on the viewing conditions. In this case, the goal of classical color gamut mapping is to map the colors that can be reproduced by the source display device into the color gamut of the target display device. This operation is called device-to-device color gamut mapping. Often, the color gamut of the target display device is smaller than the gamut of the source display device. One may then call this operation gamut compression. The inverse case is called gamut expansion. Both cases may apply at the same time if the color gamut of the target display device is smaller than the color gamut of the source display device for colors with certain hues, luminances or saturations but larger for other colors.

In a second application of such a color gamut mapping, the source GBD describes the color gamut of the source content instead of the color gamut of the source display device. The source content color gamut is usually smaller than the source device color gamut. In this case, the goal of classical color gamut mapping is to map the colors of the source content into the color gamut of the target display device. This operation is called content-to-device gamut mapping. The source GBD might change if the color characteristics of the content change. In this case, the color mapping operator needs to be updated. For example, a new LUT may be calculated for every scene of a film. Since this update is usually slow, the frequency of change of the source GBD is usually limited.

SUMMARY OF INVENTION

An object of the invention is to solve the aforementioned problems, by proposing two basic methods illustrated on FIGS. 3 and 5. The proposed color mapping methods changes the order of operations with respect to FIG. 1.

A first basic embodiment illustrated on FIG. 3 comprises a first step of color gamut mapping applied directly to the incoming RGB color coordinates resulting into mapped source coordinates R"G"B" and a second step where these source coordinates are transformed into target coordinates R'G'B'. More precisely, this method of mapping source colors from a source color gamut into the target color gamut of a target color device thus resulting in target colors, wherein these source colors are represented by color coordinates in a source device-dependent color space, comprises:

in said source device-dependent color space, mapping each of said source colors from said source color gamut into said target color gamut resulting in a target color represented by color coordinates in said source device-dependent color space, and transforming the color coordinates representing said target color in said source device-dependent color space into color coordinates representing said target color in the target device-dependent color space of said target color device.

To implement this mapping step, preferably both the source color gamut and the target color gamut are represented in this color space. When the target color gamut is represented in the target color space, an inverse of the transforming step above is preferably applied to the target color gamut in order to have this target color gamut represented in the source device-dependent color space before performing the mapping step.

This method uses a color mapper configured to implement this method.

A second basic embodiment illustrated on FIG. 5 comprises a first step where the incoming source coordinates RGB are transformed into target coordinates R"G"B" and a second step of color gamut mapping applied directly to the target coordinates R"G"B" resulting into mapped target coordinates R'G'B'. More precisely, this method of mapping source colors from a source color gamut into the target color gamut of a target color device thus resulting in target colors, comprises:

transforming color coordinates representing each of said source colors in a source device-dependent color space into color coordinates representing said source color in the target device-dependent color space of said target color device, and in said target device-dependent color space, mapping said source color as represented in said target device-dependent color space from said source color gamut into said target color gamut resulting in a target color. To implement this mapping step, preferably both the source color gamut and the target color gamut are represented in this color space. When the source color gamut is represented in the source color space, the transforming step above is preferably applied to the source color gamut in order to have this source color gamut represented in the target device-dependent color space before performing the mapping step.

This method uses a color mapper configured to implement this method.

In the first basic embodiment of FIG. 3, the source device model—namely the source forward transform—that describes the reproduction of colors by the source color device—can operate not only for colors inside the source device color gamut but also for colors that are located, after mapping, outside the source device color gamut. Prior to the invention, source device models operate usually only for colors that are inside the source color gamut.

Similarly, in the second basic embodiment of FIG. 5, the target device model—namely the target inverse transform—that describes the reproduction of colors by the target color device—generates not only colors that are inside the target device color gamut but also colors that are located outside the target device color gamut, as soon as these colors are located inside the target device color gamut after the mapping. Prior to the invention, target device models usually operate only on colors that are inside the target color gamut.

For the purpose of solving the aforementioned problems, a subject of the invention is notably a method of mapping source colors from a source color gamut into the target color gamut of a target color device thus resulting in target colors, a source color device being modeled by a source forward transform defined to transform color coordinates representing any color in a source device-dependent color space into color coordinates representing approximately the same color in a device-independent color space, said target color device being modeled by a target inverse transform defined to transform color coordinates representing any color in said device-independent color space into color coordinates representing approximately the same color in a target device-dependent color space, comprising the steps of:

1/ applying an inverse of said target inverse color transform and then an inverse of said source forward transform to said target color gamut in order to obtain a transformed target color gamut, 2/ for each source color to map, in said source device-dependent color space, mapping said source color from said source color gamut into said transformed target color gamut resulting in a target color, and 3/ applying said source forward transform to transform the color coordinates representing said target color in said source device-dependent color space into color coordinates representing said target color in said device-independent color space, and then, applying said target inverse transform to transform color coordinates representing said target color in said device-independent color space into color coordinates representing said target color in said target device-dependent color space.

Note that the applying step 3/ is a specific embodiment of the transforming step of the first basic embodiment above.

Preferably, the source forward transform is defined as being able to operate for colors that are located outside said source color gamut.

A subject of the invention is also a method of mapping source colors from a source color gamut into the target color gamut of a target color device thus resulting in target colors, a source color device being modeled by a source forward transform defined to transform color coordinates representing any color in a source device-dependent color space into color coordinates representing approximately the same color in a device-independent color space, said target color device being modeled by a target inverse transform defined to transform color coordinates representing any color in said device-independent color space into color coordinates representing approximately the same color in a target device-dependent color space, comprising the steps of:

1/ applying said source forward transform and then said target inverse color transform to said source color gamut in order to obtain a transformed source color gamut, 2/ for each source color to map, applying said source forward transform to transform color coordinates representing said source color in said source device-dependent color space into color coordinates representing said source color in said device-independent color space, and then, applying said target inverse transform to transform color coordinates representing said source color in said device-independent color space into color coordinates representing said source color in said target device-dependent color space, and 3/ mapping said source color represented by said color coordinates in said target device-dependent color space from said transformed source color gamut into said target color gamut resulting in a target color.

Note that the applying step 2/ is a specific embodiment of the transforming step of the second basic embodiment above.

Preferably, the target inverse transform is defined as being able to operate for colors that are located outside said target color gamut.

The source color gamut may be the same or may be different from the source device color gamut of the source color device.

The pre-concatenation of the source forward transform with the target inverse transform allows transforming directly color coordinates representing a color in the source device-dependent color space into color coordinates representing said color in the target device-dependent color space. In such a situation, as opposed to gamut mapping methods of the prior art, during the implementation of the mapping method according to the invention, color coordinates do not need any more to be transformed into device independent color coordinates, thus complexity and computational load is reduced. As opposed to gamut mapping methods of the prior art, the preconcatenated transform is purely device dependent.

Similarly, metadata describing source color gamut boundaries and target color gamut boundaries do not need to be transformed into device independent color coordinates, thus complexity and computational load is reduced. Moreover, when these metadata changes, the mapping step of the method according to the invention needs to be updated but advantageously without updating the whole classical color management chain and notably without updating the pre-concatenated transform above. Such an update is less complex and computational load is reduced.

A subject of the invention is also a color mapper for mapping source colors from a source color gamut into the target color gamut of a target color device thus resulting in target colors, in which a source color device is modeled by a source forward transform defined to transform color coordinates representing any color in a source device-dependent color space into color coordinates representing approximately the same color in a device-independent color space, and in which a target color device is modeled by a target inverse transform defined to transform color coordinates representing any color in said device-independent color space into color coordinates representing approximately the same color in a target device-dependent color space, said color mapper being configured, 1/ to apply an inverse of said target inverse color transform and then an inverse of said source forward transform to said target color gamut in order to obtain a transformed target color gamut, 2/ to map, in said source device-dependent color space, each source color from said source color gamut into said transformed target color gamut resulting in a target color, 3/ for each target color, to apply said source forward transform to transform the color coordinates representing said target color in said source device-dependent color space into color coordinates representing said target color in said device-independent color space, and then, to apply said target inverse transform to transform color coordinates representing said target color in said device-independent color space into color coordinates representing said target color in said target device-dependent color space, and/or being configured, 1/ to apply said source forward transform and then said target inverse color transform to said source color gamut in order to obtain a transformed source color gamut, 2/ for each source color, to apply said source forward transform to transform color coordinates representing said source color in said source device-dependent color space into color coordinates representing said source color in said device-independent color space, and to apply then said target inverse transform to transform color coordinates representing said source color in said device-independent color space into color coordinates representing said source color in said target device-dependent color space, 3/ to map said source color represented by said color coordinates in said target device-dependent color space from a transformed source color gamut into said target color gamut resulting in a target color.

The invention may provide notably the following advantages with respect to color gamut mapping methods of the prior art:

- As opposed to gamut mapping methods of the prior art, color coordinates do not need to be transformed into device independent color coordinates, thus complexity and computational load is reduced;
- As opposed to classical gamut mapping, metadata describing the source color gamut and/or describing the target color gamut do not need to be transformed into device independent color coordinates, thus complexity and computational load is reduced;
- As opposed to classical gamut mapping, when metadata changes, the color gamut mapping operator can be updated without updating the whole classical color management chain. The update is less complex and computational load is reduced.

BRIEF DESCRIPTION OF DRAWINGS

The invention will be more clearly understood on reading the description which follows, given by way of non-limiting example and with reference to the appended figures in which.

DESCRIPTION OF EMBODIMENTS

Figure 1:
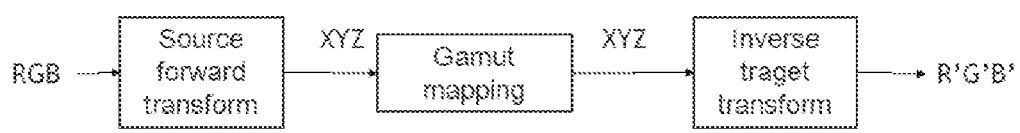
FIG. 1, already mentioned, illustrates a mapping method according to the prior art, FIG. 2, already mentioned, corresponds to the mapping method of FIG. 1 where the color gamut descriptors used to build the mapping operator are illustrated based on the prior art, FIG. 3, already mentioned, illustrates a first main embodiment of the mapping method according to the invention, FIG. 4, corresponds to the mapping method of FIG. 3 where the color gamut descriptors used to build the mapping operator are illustrated, FIG. 5, already mentioned, illustrates a second main embodiment of the mapping method according to the invention, FIG. 6 corresponds to the mapping method of FIG. 5 where the color gamut descriptors used to build the mapping operator are illustrated.
Figure 2:
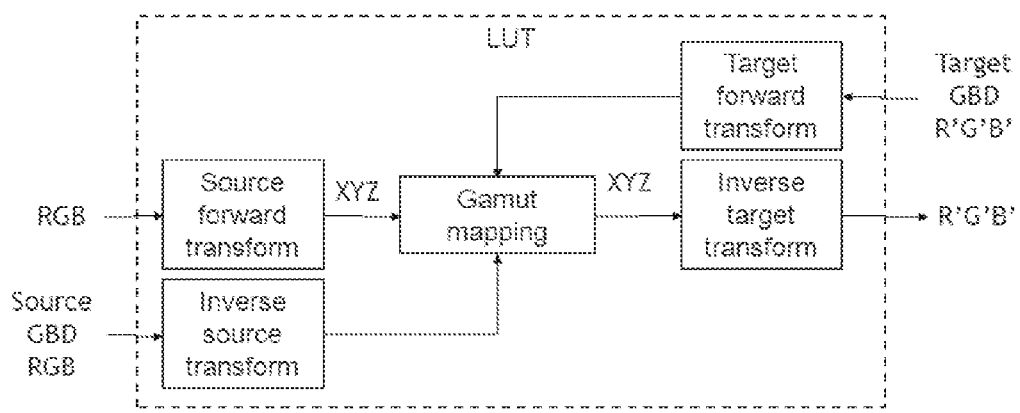

The functions of the various elements shown in the figures may be provided through the use of a color mapper, i.e. a dedicated hardware as well as hardware capable of executing software in association with appropriate software. Such hardware may notably include, without limitation, digital signal processor ("DSP"), read-only memory ("ROM") for storing software, random access memory ("RAM"), and non-volatile storage.

The invention will now be described in the context of mapping colors of source images of a video content. The colors of the pixels of each image, i.e. the source colors to map, are represented by RGB color coordinates in a source device-dependent color space.

In preliminary steps of the method according to the invention, the following operations are performed:

1. Building a source device model that describes the reproduction of colors by a source color device such that this model is able to transform RGB color coordinates representing these colors in the source device dependent color space into device independent XYZ color coordinates representing the same colors in the CIE-XYZ color space in a way that this model can operate for both, colors inside and colors outside the source color gamut. This source device model is generally called a forward color transform.

2. Building a target device model that describes the reproduction of colors by a target color device such that this model is able to transform XYZ color coordinates representing colors in the CIE-XYZ color space into RGB color coordinates representing the same colors in the target device dependent color space. This target device model is generally called an inverse color transform.

3. Describing the source color gamut by a source gamut boundary description using source device RGB color coordinates. Note that the source color gamut may be the same or may be different from the source device color gamut of the source color device.

4. Describing the target color gamut by a target gamut boundary description represented in source device RGB color coordinates. Preferably, as illustrated on FIG. 4, the description of the target color gamut by a target gamut boundary description operative in the source device color space—i.e. represented in source device RGB color coordinates—can be achieved by applying to a gamut boundary description of the target color device operative in the target device dependent color space an inverse of the target device model above—i.e. a target forward color transform—able to transform target device RGB color coordinates into device independent XYZ color coordinates, and then applying an inverse of the source device model above—i.e. a source inverse color transform—able to transform device independent XYZ color coordinates into source device RGB color coordinates. In a whole, these two successive applications correspond to the application of an inverse of the concatenation of the source forward transform and of the target inverse transform.

5. Defining a gamut mapping operator able to map, in the source device dependent color space, all colors located in the source gamut boundary description into colors located in the target gamut boundary description.

Figure 3:
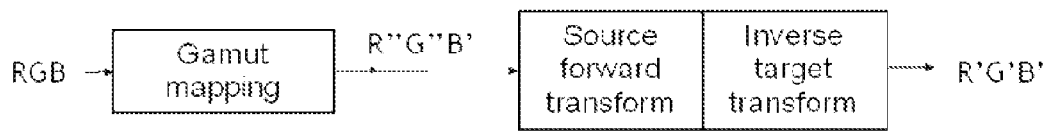

Then, according to a first main embodiment of the invention illustrated on FIG. 3, the method according to the invention is performed according to the following steps:

1. Applying the gamut mapping operator for mapping source colors having RGB color coordinates in the source device dependent color space from the source color gamut into the target color gamut, resulting in targets colors having color coordinates R"G"B" in the same source device dependent color space;

2. Transforming the color coordinates R"G"B" representing targets colors in the source device dependent color space into color coordinates R'G'B' representing the same targets colors in the target device dependent color space by applying the source device model (i.e. a forward color transform) to these color coordinates R"G"B" resulting in XYZ color coordinates, and by applying the target color device model (i.e. an inverse color transform) to these XYZ color coordinates.

Figure 5:
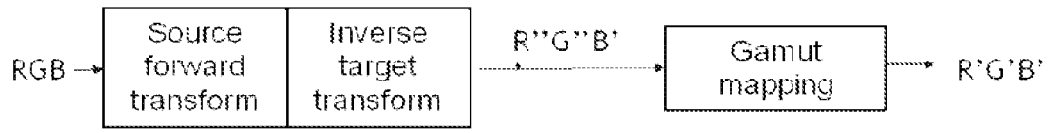
Figure 6:
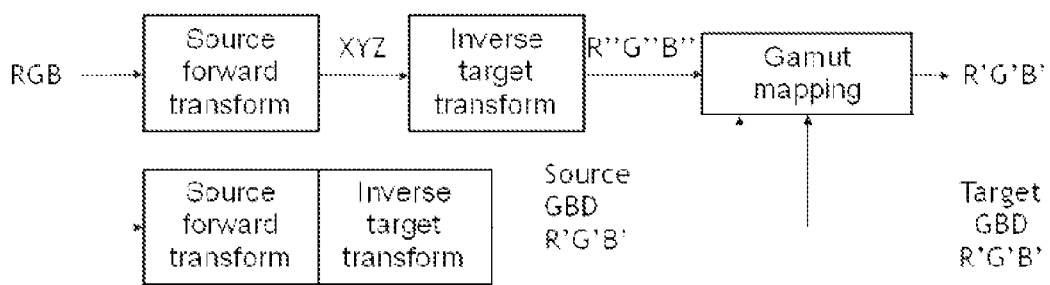

According to a second main embodiment of the invention illustrated on FIG. 5, the target device model is built such that it can operate on both, colors inside and colors outside the target device color gamut, as opposed to usual target device models that operate on colors that are all inside the target color gamut. In this second embodiment, the description of the target color gamut by a target gamut boundary description uses target device RGB color coordinates (instead of using source device RGB color coordinates as in the first embodiment above). Preferably, as illustrated on FIG. 6, the description of the source color gamut by a source gamut boundary description uses target device RGB color coordinates in order to be operative in the target device color space. Such a description can be achieved by applying to a gamut boundary description of the source color device operative in the source device dependent color space the source device model above—i.e. a forward color transform—able to transform source device RGB color coordinates into device independent XYZ color coordinates, and by applying then the target device model above—i.e. an inverse color transform—able to transform device independent XYZ color coordinates into target device R'G'B' color coordinates. The gamut mapping operator is then defined in the target device dependent color space (instead of being defined in the source device dependent color space as in the first embodiment). This gamut mapping operator is defined to be able to map colors located inside the source gamut boundary description operative in the target device dependent color space into colors located within the target gamut boundary description.

The method according to this second main embodiment of the invention is then performed according to the following steps:

1. Transforming the color coordinates RGB representing source colors in the source device dependent color space into color coordinates R'G'B' representing the same source colors in the target device dependent color space by applying the source device model (i.e. a forward color transform) to these color coordinates RGB resulting in XYZ color coordinates, and by applying the target color device model (i.e. an inverse color transform) to these XYZ color coordinates.

2. Applying the gamut mapping operator for mapping source colors having R'G'B' color coordinates in the target device dependent color space from the source color gamut into the target color gamut, resulting in targets colors having color coordinates R'G'B' in the target device dependent color space.

Preferably, all color transforms and color mapping operator are represented by Look Up Tables (LUT).

Figure 4:
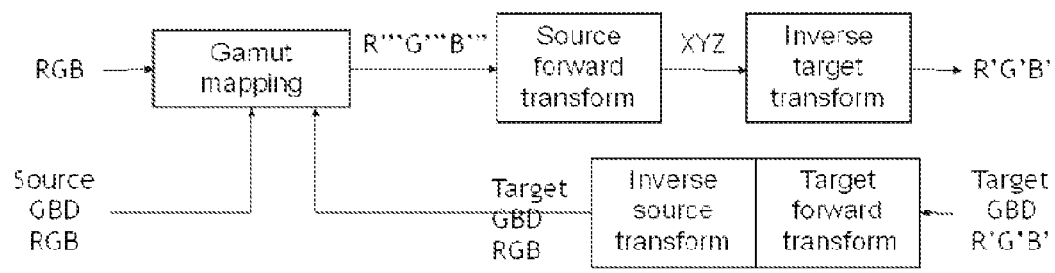

A specific example of the first embodiment illustrated on FIG. 4 will now be described in reference to FIG. 7.

We assume that the source RGB color space is defined by the ITU-R BT.709 standard. The implementation contains the following modules that correspond to the preliminary steps of the invention as described above:
Source device model;
Target device model;
Color space conversion between source RGB coordinates and target RGB coordinates;
Color space conversion between source RGB coordinates and source YUV coordinates.

Source Device Model

The source device model contains a source device forward transform and a source device inverse transform. The source device forward transform describes the reproduction of colors by the source color device and is able to transform source RGB color coordinates into source device dependent color space into device independent XYZ color coordinates. Usually, a source device forward transform is derived from measurements of device dependent and device independent color coordinates of test colors by interpolation or model fitting. This concerns colors inside the source gamut.

As stated above, this source device model should be able to operate for both, colors inside and color outside the source color gamut. But colors outside the source gamut cannot be reproduced by the source display. Therefore, such a source device model able to transform color coordinates of colors located outside the source color gamut cannot be derived from measurements, only. It can be derived from extrapolation of measurements or using a model with large range of operation that is fitted to be measurements and having extrapolation capability.

In the implementation of this example, the source device model needs to be compliant with the ITU-R BT.709 standard. Here, the source device forward transform has two steps:
1. Transform source RGB coordinates into linear source RGB coordinates:

$$R_{LIN} = \begin{cases} \frac{1}{4.5}R & 0 \leq R < 0.081 \\ R^{1/0.45} & 0.081 \leq R \leq 1 \end{cases}$$

and equivalently for G and B;
2. Transform linear source RGB coordinates into XYZ coordinates:

$$\begin{pmatrix} X \\ Y \\ Z \end{pmatrix} = \begin{pmatrix} 0.41 & 0.36 & 0.18 \\ 0.21 & 0.72 & 0.07 \\ 0.02 & 0.12 & 0.95 \end{pmatrix} \begin{pmatrix} R_{LIN} \\ G_{LIN} \\ B_{LIN} \end{pmatrix}$$

In order to make the device model working for both, colors inside and colors outside the source device color gamut, we modify the first step as follows:

1. Transform source RGB coordinates into linear source RGB coordinates for colors inside and outside the source color gamut:

$$R_{LIN} = \begin{cases} \frac{1}{4.5}R & R < 0.081 \\ R^{1/0.45} & 0.081 \leq R \end{cases}$$

and equivalently for G and B;
simply by allowing the formula to go beyond the source RGB cube, i.e. to go to source RGB coordinates larger than 1 or smaller than zero. Consequently, the resulting XYZ color coordinates may go beyond 1 or below 0.

We also define the source device inverse transform as the inverse of the source device forward transform. The source device inverse transform transforms XYZ coordinates into source RGB coordinates, for colors inside and outside of the source color gamut, according to the following two steps:
1. Transform XYZ coordinates into linear source RGB coordinates:

$$\begin{pmatrix} R_{LIN} \\ G_{LIN} \\ B_{LIN} \end{pmatrix} = \begin{pmatrix} 0.41 & 0.36 & 0.18 \\ 0.21 & 0.72 & 0.07 \\ 0.02 & 0.12 & 0.95 \end{pmatrix}^{-1} \begin{pmatrix} X \\ Y \\ Z \end{pmatrix},$$

using the inverse matrix
2. Transform linear source RGB coordinates into source RGB coordinates:

$$R = \begin{cases} 4.5 R_{LIN} & R_{LIN} < 0.18 \\ R_{LIN}^{1/0.45} & 0.081 \leq R_{LIN} \end{cases}$$

and equivalently for G and B;
Target Device Model

In this implementation, we assume that the target display device can be any CE display and that its color characteristics are described by an ICC profile according to the standard ISO 15076-1:2005 entitled "Image technology colour management—Architecture, profile format and data structure—Part 1: Based on ICC.1:2004-10". If the CE display maker does not deliver the ICC profile, standard color characterization tools can be used to produce the ICC profile. In order to specify the target display device model, we will use colorimetric intent transforms of the ICC profile:
For the target forward transform, we use the colorimetric rendering intent transform A to B of the ICC profile;
For the target inverse transform, we use the colorimetric rendering intent transform B to A of the ICC profile.
These transforms are only defined within the target color gamut, i.e. within the target RGB cube.

Color Space Conversion Between Source/Target RGB

For transforming color coordinates from source RGB coordinates to target RGB coordinates, we perform two steps:
1. We transform the source RGB coordinates into XYZ coordinates using the source forward transform;
2. We transform the XYZ coordinates into target RGB coordinates using the target inverse transform.
This transformation accepts colors inside and outside the source gamut (i.e. inside and outside of the source RGB cube) since the source forward transform is specifically designed for that.

On the opposite, for transforming color coordinates from target RGB coordinates to source RGB coordinates, we perform two steps:
1. We transform the target RGB coordinates into XYZ coordinates using the target forward transform;
2. we transform the XYZ coordinates into source RGB coordinates using the source inverse transform.

Color Space Conversion Between Source RGB/YUV

In this implementation of the example, the gamut mapping step of the method according to the invention will be executed in YUV color space. This color space is very closely defined with respect to the RGB space in the following way:

$$Y = 0.299R + 0.587G + 0.114B$$

$$U = 0.492(B-Y)$$

$$V = 0.877(R-Y)$$

The YUV color space has the advantage that the Y channel can be seen as an approximated luminance channel, while the UV plane spanned by the U and V channels can be seen as an approximated chroma plane defining the hue and the saturation of the colors.

In a manner known per se, we define a first color space converter for RGB to YUV conversion and a second color space converter for YUV to RGB conversion.

Gamut Mapping Procedure

Figure 7:
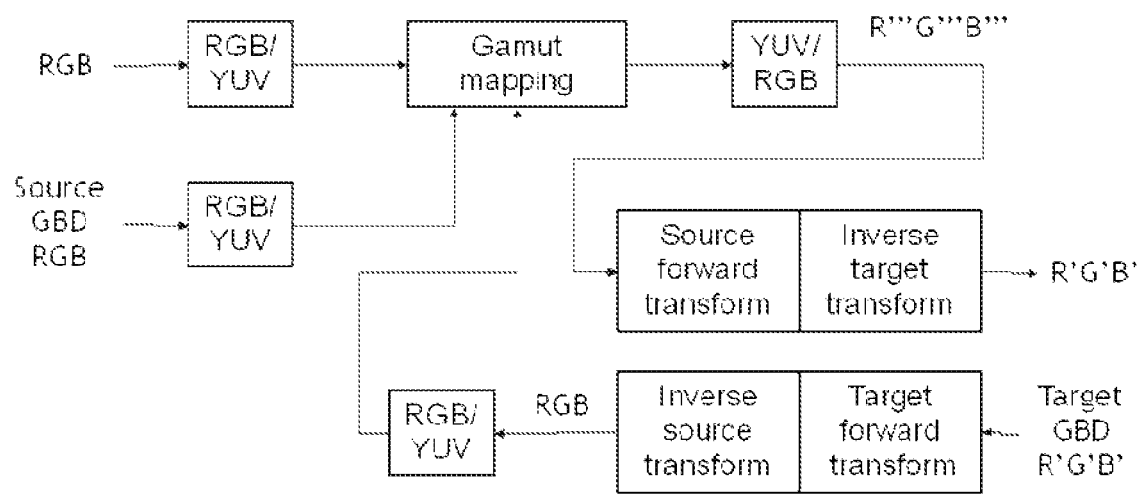
FIG. 7 illustrates a specific example of the first main embodiment of FIG. 4.

The gamut mapping procedure is executed such as shown in FIG. 7. As already emphasized above, important parameters for gamut mapping are the source and target gamut boundary descriptions (GBD). For GBD, we use the basic profile of the IEC 61966-12-1 "Gamut ID" format. Each GBD is described by 5 colors: red, green, blue, black, white. We build from this information six triangles that build together the boundary of a gamut:
black-red-green;
black-green-blue;
black-blue-red;
white-red-green;
white-green-blue;
white-blue-red.

The target GBD target RGB coordinates are transformed into source RGB coordinates and then into YUV coordinates. The source image RGB coordinates and the source GBD RGB coordinates are transformed into YUV coordinates.

We now describe a sample implementation of the gamut mapping. All operations are executed in YUV color space.

An input source color described by its source YUV coordinates is mapped to an intermediate color with source Y"U"V" coordinates by the following steps:
1. Projection of the source color $$C = \begin{pmatrix} Y \\ U \\ V \end{pmatrix}$$

onto the grey axis gives an anchor point $$A = \begin{pmatrix} Y \\ 0 \\ 0 \end{pmatrix};$$

2. Calculation of the intersection points $I_S$ and $I_T$ of the line going through C and A with the source and target GBD, respectively;
3. Mapping all colors lying on the line section $\overline{AI_S}$ to the line section $\overline{AI_T}$, as so the color C becoming mapped color $$C'' = \begin{pmatrix} Y'' \\ U'' \\ V'' \end{pmatrix}.$$

Color Space Conversion Between Source YUV/RGB

After gamut mapping, the source Y"U"V" coordinates of the intermediate color are mapped into source R"G"B" coordinates according to:

$$B'' = Y'' + U''/0.492$$

$$R'' = Y'' + V''/0.877$$

$$G'' = (Y'' - 0.299R'' - 0.114B'')/0.587$$

It is to be understood that the invention may be implemented in a color mapper including various forms of hardware, software, firmware, special purpose processors, or combinations thereof. The invention may be notably implemented in a color mapper implementing a combination of hardware and software. Moreover, the software may be implemented as an application program tangibly embodied on a program storage unit. The application program may be uploaded to, and executed by, a machine comprising any suitable architecture. Preferably, the color mapper is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU and/or by a GPU. In addition, various other peripheral units may be connected to the computer platform such as an additional data storage unit and a printing unit.

While the present invention is described with respect to particular examples and preferred embodiments, it is understood that the present invention is not limited to these examples and embodiments. The present invention as claimed therefore includes variations from these embodiments described herein, as will be apparent to one of skill in the art.

In the claims hereof, any element expressed as a means or a configuration for performing a specified function is intended to encompass any way of performing that function including, for example, a) a combination of circuit elements that performs that function or b) software in any form, including, therefore, firmware, microcode or the like, combined with appropriate circuitry for executing that software to perform the function.

The invention claimed is:
1. Method of, in a color mapper, mapping source colors represented by color coordinates in a source device-dependent color space from a source color gamut into the target color gamut of a target color device thus resulting in target colors represented by color coordinates in the target device-dependent color space of said target color device, comprising:

in said source device-dependent color space, mapping each of said source colors from said source color gamut into said target color gamut resulting in a target color represented by color coordinates in said source device-dependent color space, and transforming the color coordinates representing said target color in said source device-dependent color space into color coordinates representing said target color in said target device-dependent color space.

2. Method of mapping source colors according to claim 1, wherein a source color device is modeled by a source forward transform defined to transform color coordinates representing a color in said source device-dependent color space into color coordinates representing approximately the same color in a device-independent color space, wherein said target color device is modeled by a target inverse transform defined to transform color coordinates representing a color in said device-independent color space into color coordinates representing approximately the same color in said target device-dependent color space, and wherein said transforming comprises applying said source forward transform and then said target inverse transform to the color coordinates representing said target color.

3. Method of mapping source colors according to claim 2 wherein the source forward transform is defined as being able to operate for colors that are located outside said source color gamut.

4. Method of mapping source colors according to claim 1, comprising, before said mapping in said source device-dependent color space and when said target color gamut is represented in said target color space, applying an inverse of said transforming step above to said target color gamut in order to have said target color gamut represented in said source device-dependent color space.

5. Color mapper for mapping source colors from a source color gamut into the target color gamut of a target color device thus resulting in target colors, wherein these source colors are represented by color coordinates in a source device-dependent color space, said color mapper being configured:

to map, in said source device-dependent color space, each of said source colors from said source color gamut into said target color gamut resulting in a target color represented by color coordinates in said source device-dependent color space, and to transform the color coordinates representing said target color in said source device-dependent color space into color coordinates representing said target color in the target device-dependent color space of said target color device.

6. Method of, in a color mapper, mapping source colors represented by color coordinates in a source device-dependent color space from a source color gamut into the target color gamut of a target color device thus resulting in target colors represented by color coordinates in the target device-dependent color space of said target color device, comprising:

transforming color coordinates representing each of said source colors in said source device-dependent color space into color coordinates representing said source color in the target device-dependent color space of said target color device, and in said target device-dependent color space, mapping said source color as represented in said target device-dependent color space from said source color gamut into said target color gamut resulting in a target color represented by color coordinates in said target device-dependent color space.

7. Method of mapping source colors according to claim 6, wherein a source color device is modeled by a source forward transform defined to transform color coordinates representing a color in a source device-dependent color space into color coordinates representing approximately the same color in a device-independent color space, wherein said target color device is modeled by a target inverse transform defined to transform color coordinates representing a color in said device-independent color space into color coordinates representing approximately the same color in said target device-dependent color space, and wherein said transforming comprises applying said source forward transform and then said target inverse transform to the color coordinates representing said source color.

8. Method of mapping source colors according to claim 7 wherein the target inverse transform is defined as being able to operate for colors that are located outside said target color gamut.

9. Method of mapping source colors according to claim 6, comprising, before said mapping in said target device-dependent color space and when said source color gamut is represented in said source color space, applying said transforming to said source color gamut in order to have said source color gamut represented in said target device-dependent color space.

10. Color mapper for mapping source colors from a source color gamut into the target color gamut of a target color device thus resulting in target colors, configured:

to transform color coordinates representing each of said source colors in a source device-dependent color space into color coordinates representing said source color in the target device-dependent color space of said target color device, and to map, in said target device-dependent color space, said source color as represented in said target device-dependent color space from said source color gamut into said target color gamut resulting in a target color.

* * * * *